United States Patent
Nada (10) Patent No.: US 6,522,960 B2
(45) Date of Patent: Feb. 18, 2003

(54) VEHICLE WITH POWER SOURCE SYSTEM MOUNTED THEREON, POWER SOURCE SYSTEM CONTROLLER, METHOD OF CONTROLLING POWER SOURCE SYSTEM, AND METHOD OF CONTROLLING START OF SUCH VEHICLE

(75) Inventor: Mitsuhiro Nada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 5 days.

(21) Appl. No.: 09/833,582

(22) Filed: Apr. 13, 2001

(65) Prior Publication Data

US 2001/0041952 A1 Nov. 15, 2001

(30) Foreign Application Priority Data

May 2, 2000 (JP) ........................................ 2000-133297

(51) Int. Cl.$^7$ ............................................... F02D 29/02
(52) U.S. Cl. ...................... 701/22; 180/65.1; 180/65.8; 307/10.6; 320/104
(58) Field of Search .................. 701/22, 36; 180/65.1, 180/65.2, 65.3, 65.4, 65.8; 340/455; 307/10.1, 10.6, 10.7; 320/104

(56) References Cited

U.S. PATENT DOCUMENTS

| | | | |
|---|---|---|---|
| 5,334,926 A | * | 8/1994 | Imaizumi ..................... 307/16 |
| 5,717,310 A | * | 2/1998 | Sakai et al. ................. 307/10.1 |
| 5,796,175 A | * | 8/1998 | Itoh et al. ................... 307/10.1 |
| 5,798,629 A | * | 8/1998 | Terauchi ..................... 320/106 |
| 5,998,884 A | * | 12/1999 | Kitamine et al. ........... 180/65.8 |
| 6,081,098 A | * | 6/2000 | Bertness et al. ............. 320/134 |
| 6,313,546 B1 | * | 11/2001 | Nishimura et al. ......... 307/125 |

FOREIGN PATENT DOCUMENTS

| | | |
|---|---|---|
| JP | 64-0 85502 | 3/1989 |
| JP | 11-18213 A | 1/1999 |

* cited by examiner

Primary Examiner—Michael J. Zanelli
Assistant Examiner—Eric M Gibson
(74) Attorney, Agent, or Firm—Oliff & Berridge, PLC (57) ABSTRACT

A minimum reference voltage and an operation inhibiting reference voltage are set as the criteria for detecting the conditions of power supply of a low voltage power source system including a low voltage battery. The operation inhibiting reference voltage is lower than the minimum reference voltage and represents a threshold value ensuring the normal operation of an apparatus that establishes the power source of a high voltage power source system. When the power source voltage of the low voltage battery is lower than the minimum reference voltage but is not lower than the operation inhibiting reference voltage, a converter is activated to charge the low voltage battery to the minimum reference voltage whole system of, for normal functions. When the power source voltage of the low voltage battery is lower than the operation inhibiting reference voltage, on the other hand, operation of the whole system is inhibited.

18 Claims, 6 Drawing Sheets

VEHICLE WITH POWER SOURCE SYSTEM MOUNTED THEREON, POWER SOURCE SYSTEM CONTROLLER, METHOD OF CONTROLLING POWER SOURCE SYSTEM, AND METHOD OF CONTROLLING START OF SUCH VEHICLE

BACKGROUND OF THE INVENTION

1. Field of the Invention

The present invention relates to a vehicle that utilizes electrical energy of a high voltage power source system, a power source system controller mounted on an apparatus that utilizes the electrical energy of the high voltage power source system, and a method of controlling a power source system. More specifically the invention pertains to a technique that utilizes a converter to convert the electrical energy of a high voltage battery into a low voltage and supply the converted low voltage and accordingly enables application of the electrical energy of a high voltage power source system including the high voltage battery.

2. Description of the Related Art

There are a diversity of recently proposed vehicles that utilize high voltage electrical energy of, for example, high voltage batteries. Typical examples of such vehicles include special vehicles that have a high voltage battery mounted thereon and carry out various works with the electric power of the high voltage battery, electric vehicles that run with the energy of a battery, and hybrid vehicles that have an internal combustion engine and a battery mounted thereon and use the power of the internal combustion engine in combination with the power of the battery. These vehicles generally have two batteries, that is, a high voltage battery that stores high voltage electrical energy used for driving and a low voltage battery that stores low voltage electrical energy used for controlling drives of the vehicle and regulating auxiliary machinery mounted on the vehicle. While the low voltage battery is used only as the auxiliary machinery battery in conventional vehicles driven with only the power of the internal combustion engine, the low voltage battery functions as the power source for controlling a high voltage power source system including the high voltage battery in addition to the function as the auxiliary machinery battery in these recently proposed vehicles. Namely the low voltage battery is of the greater importance with an increase of its loading. In order to ensure supply of electrical energy to the low voltage battery, the prior art electric vehicle has a converter circuit that converts the electrical energy of the high voltage power source system into a low voltage and charges the low voltage battery with the converted low voltage electrical energy.

In spite of such consideration, the voltage drop of the low voltage battery is inevitable, due to the continuously driven, large electric loading like headlights and the natural discharge from the battery in the inactive state over a long term. The proposed safety measures by taking into account the importance of the low voltage battery inhibit the system of the electric vehicle from being activated when the voltage of the low voltage battery is lower than a minimum reference voltage. While the voltage of the low voltage battery is lower than a predetermined level, the voltage of the power line for a controller that takes charge of control operations may fluctuated even with the use of a stabilizing power source unit. The prior art vehicle and the prior art power source controller mounted on an apparatus thus uniformly inhibit its activation when the voltage of the lower voltage battery is lower than the predetermined level.

The method of uniformly inhibiting the activation, however, undesirably lowers the convenience in use of the prior art vehicle and the prior art power source controller mounted on the apparatus. As mentioned above, the loading applied to the low voltage battery has been increasing significantly. A simple increase in storage capacity with the increasing load, however, has limitations, since it undesirably makes the low voltage battery bulky and heavy. The voltage of the low voltage battery that is subject to heavy loading may thus be deviated from a normal range and lowered to or below the minimum reference voltage. The prior art technique inhibits the power supply to the controller that takes charge of control operations relating to drives of the vehicle, thus prohibiting the vehicle from being activated. A simple decrease in minimum reference voltage undesirably lowers the safety factor of the whole system and is thus not adoptable.

The low voltage battery is also generally used as the power source for driving an apparatus that establishes the high voltage power source line, for example, a relay that connects the output of the high voltage battery with the power line of the high voltage power source system. The extreme drop in voltage of the low voltage battery makes the operations of such an apparatus unstable. Under the condition of the lowered voltage of the low voltage power source system, the contact of the relay that switches on and off the high voltage has weak working force. This may result in welding the contact. It is thus impractical to simply decrease the lower limit voltage of the low voltage battery that allows a start of the vehicle or the apparatus.

SUMMARY OF THE INVENTION

The object of the present invention is thus to provide a technique that brings out the best performance of a low voltage battery, while ensuring safety of a whole system. In the case of application to a vehicle, the technique allows a start of the vehicle while guaranteeing the normal operation of the whole system of the vehicle.

At least part of the above and the other related objects is attained by a vehicle that utilizes electrical energy of a high voltage power source system including a high voltage battery. The vehicle includes: a control unit that carries out controls related to driving of the vehicle; a low voltage power source circuit that supplies electrical energy of a low voltage power source system including a low voltage battery to the control unit; a battery voltage measurement unit that measures a voltage level of the low voltage battery; a converter unit that converts the electrical energy of the high voltage power source system into a low voltage and charges the low voltage battery with the converted low voltage electrical energy; and a recovery unit that, when the observed voltage of the low voltage battery is lower than a preset minimum reference voltage at the time of a requirement to start the vehicle, activates the converter unit to recover the voltage of the low voltage battery to the preset minimum reference voltage, prior to a permission to operate the control unit.

In the vehicle of the present invention, in response to a requirement to start the vehicle, the converter unit converts the voltage of the high voltage battery into a low voltage, charges the low voltage battery with the converted low voltage electrical energy, and thereby recovers the voltage of the low voltage battery to the preset minimum reference voltage, prior to a permission to operate the control unit. This arrangement ensures a start of the vehicle even when the voltage of the low voltage battery is in a specific range that is determined to be insufficient for starting the vehicle in the prior art arrangement.

A variety of configurations may be applicable for the connections among the high voltage battery, the converter unit, and the low voltage battery. In one preferable embodiment of the present invention, the vehicle further includes a connection unit that is actuated by part of the control unit with a power supply from the low voltage power source system and connects the high voltage battery with the high voltage power source system including the converter unit. This configuration enables the converter unit to be controlled together with the other devices of the high voltage power source system. In this configuration, one applicable structure may inhibit the operation of the recovery unit when the observed voltage of the low voltage battery is lower than an operation inhibiting reference voltage. Here the operation inhibiting reference voltage corresponds to a lower limit voltage that guarantees the normal operation of the connection unit. This arrangement effectively prevents the process for recovering the voltage of the low voltage battery from being carried out while the operation of the connection unit, which connects the high voltage battery with the high voltage power source system, is rather unstable. This accordingly further enhances the reliability of the vehicle.

Activation of the recovery unit represents the fact that the voltage of the low voltage battery once falls into the insufficient level to permit the operation of the control unit. It is accordingly preferable that the vehicle further includes an information unit that informs a driver of the activation of the recovery unit. The information unit informs the driver of the occurrence of the unexpected voltage drop of the low voltage battery and enables the driver to take some measures against the unexpected voltage drop of the low voltage battery, for example, charging the low voltage battery or inspecting the whole system.

In accordance with another preferable application of the present invention, the vehicle further includes a storage unit that registers the activation of the recovery unit in the form of a record and outputs the registered record in response to an external requirement. There are a variety of causes for the unexpected voltage drop of the low voltage battery that leads to activation of the recovery unit. Some causes are just transient due to erroneous operations like keeping the headlights on during a stop of the vehicle while other causes are more fundamental like deterioration of the low voltage battery. The measures suitable for the respective causes are required. The arrangement of registering the working record of the recovery unit enables the driver to presume the cause of the unexpected voltage drop by taking into account the frequency, the time, and the season of the occurrence and take appropriate measures.

The high voltage battery mounted on the vehicle may have a diversity of applications. For example, when the vehicle has a motor that outputs power required for driving the vehicle, the high voltage battery may be used as an energy source of driving the motor. The high voltage battery may be used as the power source of various power-driven apparatuses mounted on the vehicle.

In accordance with one preferable application of this embodiment, the vehicle may further includes: an engine that outputs power by means of combustion of a fuel; a generator that generates electric power with at least the output power of the engine; and a charging circuit that charges the high voltage battery with the electric power generated by the generator. Once the vehicle starts, the engine is driven to charge the high voltage battery. This arrangement enables the high voltage battery to be continuously kept in the sufficient state of charge once the vehicle starts, thereby keeping the low voltage battery in the sufficient state of charge.

The present invention is also directed to a power source system controller mounted on an apparatus that utilizes electrical energy of a high voltage power source system including a high voltage battery. The power source system controller includes: a low voltage power source circuit that supplies electrical energy of a low voltage power source system including a low voltage battery to a control unit that takes charge of controlling the apparatus; a battery voltage measurement unit that measures a voltage level of the low voltage battery; a converter unit that converts the electrical energy of the high voltage power source system into a low voltage and charges the low voltage battery with the converted low voltage electrical energy; and a recovery unit that, when the observed voltage of the low voltage battery is lower than a preset minimum reference voltage at the time of a requirement to start the apparatus, activates the converter unit to recover the voltage of the low voltage battery to the preset minimum reference voltage, prior to a permission to operate the control unit.

In the power source system controller of the present invention, when the voltage of the low voltage battery is lower than the preset minimum reference voltage at the time of a requirement to start the apparatus, the converter unit is activated to recover the voltage of the low voltage battery to the preset minimum reference voltage. This arrangement ensures a start of the apparatus even when the voltage of the low voltage battery is in a specific range that is determined to be insufficient for starting the apparatus in the prior art arrangement.

Any of the arrangements applied for the vehicle as discussed above may also be applicable for the power source system controller mounted on the apparatus. For example, the power source system controller may have an information unit that informs a user of the activation of the recovery unit.

There is a method of controlling the power source system, which corresponds to the power source system controller discussed above. The present invention is accordingly directed to a method of controlling a power source system in an apparatus that utilizes electrical energy of a high voltage power source system including a high voltage battery. The method includes the steps of: supplying electrical energy of a low voltage power source system including a low voltage battery to a control unit that takes charge of controlling the apparatus; in response to a decrease in observed voltage of the low voltage battery, converting the electrical energy of the high voltage power source system into a low voltage and charging the low voltage battery with the converted low voltage electrical energy; and when the observed voltage of the low voltage battery is lower than a preset minimum reference voltage at the time. of a requirement to start the apparatus, recovering the voltage of the low voltage battery to the preset minimum reference voltage, prior to a permission to operate the control unit.

In response to a requirement to start the apparatus, this method recovers the voltage of the low voltage battery to the preset minimum reference voltage. This arrangement ensures a start of the apparatus even when the voltage of the low voltage battery is in a specific range that is determined to be insufficient for starting the apparatus in the prior art arrangement.

The present invention is also directed to a method of controlling a start of a vehicle, which includes a converter that converts electrical energy of a high voltage battery into a low voltage and supplies the converted low voltage and utilizes electrical energy of a high voltage power source system including the high voltage battery. The method includes the steps of: in response to a requirement to start the vehicle, comparing an observed voltage of a low voltage battery with a preset minimum reference voltage required to establish a low voltage power source system including the low voltage battery; and when the observed voltage of the low voltage battery is lower than the preset minimum reference voltage, activating the converter to recover the voltage of the low voltage battery to the preset minimum reference voltage, prior to starting the vehicle.

Even when the voltage of the low voltage battery is lower than the preset minimum reference voltage at the time of a requirement to start the vehicle, this method activates the converter unit included in the vehicle to recover the voltage of the low voltage battery to the preset minimum reference voltage. This arrangement ensures a start of the apparatus even when the voltage of the low voltage battery is in a specific range that is determined to be insufficient for starting the vehicle in the prior art arrangement.

In accordance with one preferable application, the method of controlling a start of the vehicle may further include the steps of: setting in advance an operation inhibiting reference voltage, which is lower than the minimum reference voltage and represents a threshold value ensuring a normal operation of an apparatus that establishes a power source of the high voltage power source system; and when the observed voltage of the low voltage battery is lower than the operation inhibiting reference voltage at the time of the requirement to start the vehicle, inhibiting output from the high voltage battery to the high voltage power source system including the converter. This application clearly specifies the conditions for allowing the start of the vehicle and the conditions for inhibiting the start of the vehicle, based on the observed voltage of the low voltage battery, thus enabling the guaranteed safety to be compatible with the permission to start the vehicle.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
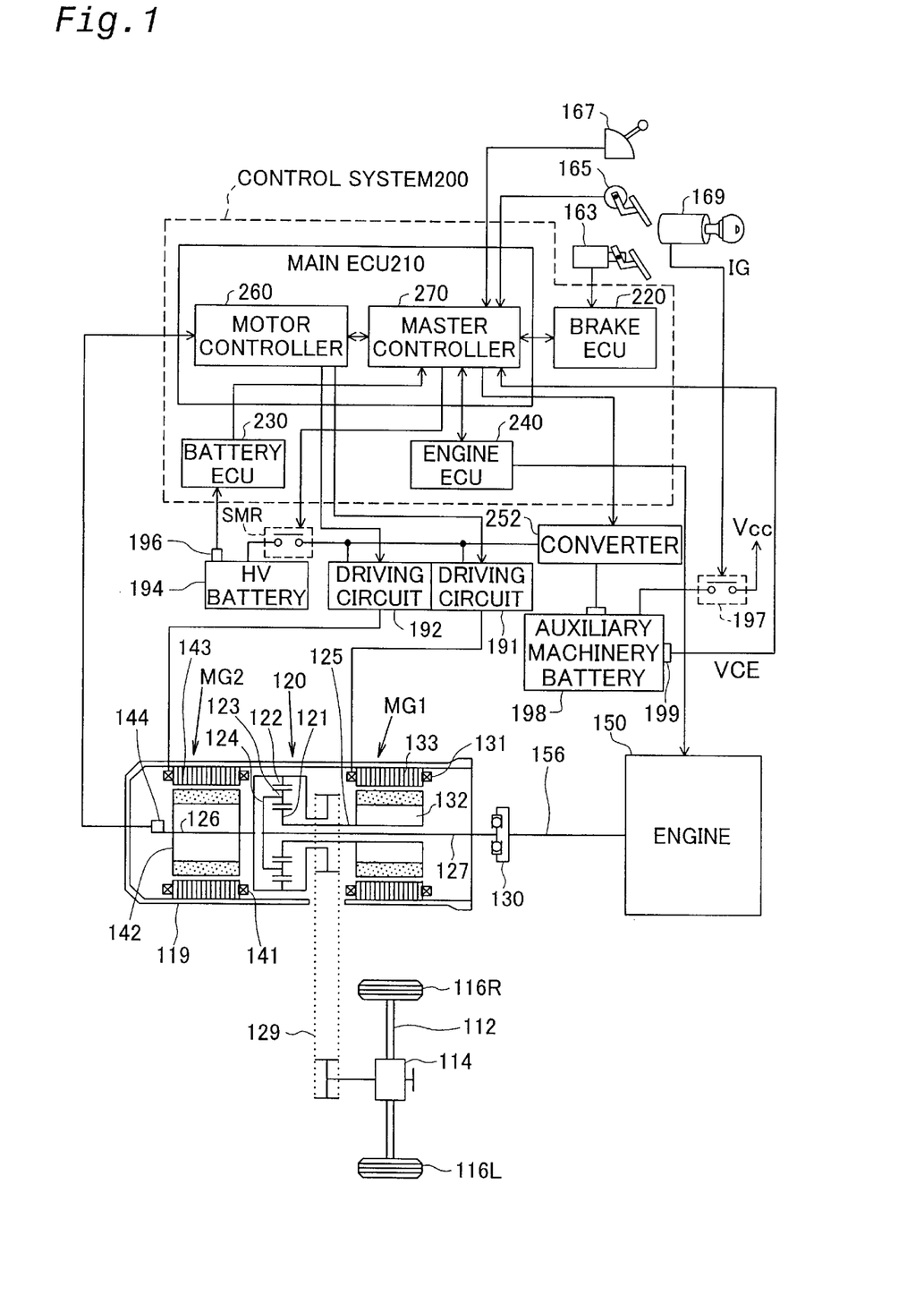
FIG. 1 schematically illustrates the general structure of a hybrid vehicle in a first embodiment of the present invention.

For the purpose of clarifying the configuration and the functions of the present invention, some modes of carrying out the present invention are discussed below as preferred embodiments in the following sequence:
A. General Structure of Hybrid Vehicle
B. Basic Operations in Hybrid Vehicle
C. Configuration of Control System in Embodiment
D. Assured Safety under Condition of Lowered Battery voltage
A. General Structure of Hybrid Vehicle FIG. 1 schematically illustrates the general structure of a hybrid vehicle in a first embodiment of the present invention. The hybrid vehicle has three prime movers, that is, one engine 150 and two motor generators MG1 and MG2. Here the motor generator represents the prime mover functioning as both a motor and a generator. In the description hereinafter, for simplicity of explanation, the motor generators are simply referred to as the motors. The hybrid vehicle is under the control of a control system 200.

The control system 200 includes a main ECU 210, a brake ECU 220, a battery ECU 230, and an engine ECU 240. Each of these ECUs is constructed as an integral unit, where a plurality of circuit elements including a microcomputer, an input interface, and an output interface are arranged on one identical circuit board. The main ECU 210 includes a motor controller 260 and a master controller 270. The master controller 270 functions to determine a variety of control-relating quantities, for example, distribution of the output from the three prime movers 150, MG1, and MG2. The control system 200 and auxiliary machinery including a diversity of sensors (discussed below) work with a supply of electric power from a 12[V] auxiliary machinery battery 198. The auxiliary machinery battery 198 corresponds to the low voltage battery of the present invention. A relay 197 is connected to the output of the auxiliary machinery battery 198. A 12[V] power is supplied to low voltage equipment, for example, the main ECU 210, via the relay 197. The supply voltage given to the low voltage equipment is hereinafter referred to as the source voltage Vcc. The relay 197 is directly activated by a signal IG transmitted from an ignition sensor 169.

The engine 150 is an ordinary gasoline engine that explosively combusts gasoline as fuel and rotates a crankshaft 156 with the combustion energy. The engine ECU 240 controls operations of the engine 150. The engine ECU 240 regulates the quantity of fuel injection into the engine 150 and other required quantities in response to instructions transmitted from the master controller 270.

The motors MG1 and MG2 are constructed as synchronous motors, and respectively include rotors 132 and 142 with a plurality of permanent magnets mounted on outer circumferential faces thereof and stators 133 and 143 with three-phase coils 131 and 141 wound thereon to form revolving magnetic fields. The stators 133 and 142 are fixed to a casing 119. The three-phase coils 131 and 141 wound on the stators 133 and 143 of the motors MG1 and MG2 are respectively connected to a high voltage (HV) battery 194 via driving circuits 191 and 192.

The HV battery 194 (approximately DC 300[V] in this embodiment) includes a large number of cell modules arranged in series and is connected to a high voltage power source system including the driving circuits 191 and 192 via a system main relay SMR, which is subjected to on-off regulation of the master controller 270. The system main relay SMR is closed to allow the supply of electric power to the high voltage power source system only which the master controller 270 finds no abnormality in the control system.

Each of the driving circuits 191 and 192 is constructed as a transistor inverter including a pair of transistors for each phase as switching elements. The driving circuits 191 and 192 are controlled by the motor controller 260. When the transistors in the driving circuit 191 or in the driving circuit 192 are switched on in response to a control signal transmitted from the motor controller 260, the electric current runs between the HV battery 194 and the motor MG1 or the motor MG2. Each of the motors MG1 and MG2 may function as the motor that receives a supply of electric power from the HV battery 194 to be driven and rotated (hereinafter this state of operation is referred to as the power operation). While the rotor 132 or 142 is rotated by an external force, the motor MG1 or MG2 may function as the generator that causes an electromotive force to be generated between both ends of the three-phase coils 131 or 141 and charges the battery HV 194 with the generated electric power (hereinafter this state of operation is referred to as the regenerative operation).

The HV battery 194 and the motors MG1 and MG2 are also connected to the auxiliary machinery battery 198 via a converter 252. This arrangement enables the high voltage electrical energy generated by the motors MG1 and MG2 or accumulated in the HV battery 194 to be converted into a low voltage of DC 12[V] and charges the auxiliary machinery battery 198 with the converted low voltage electrical energy.

The rotating shafts of the engine 150 and the motors MG1 and MG2 are mechanically linked with one another via a planetary gear 120. The planetary gear 120 includes a sun gear 121, a ring gear 122, and a planetary carrier 124 with a planetary pinion gear 123. In the hybrid vehicle of the embodiment, the crankshaft 156 of the engine 150 is coupled with a planetary carrier shaft 127 via a damper 130. The damper 130 is provided to absorb torsional vibrations arising on the crankshaft 156. The rotor 132 of the motor MG1 is linked with a sun gear shaft 125, whereas the rotor 142 of the motor MG2 is linked with a ring gear shaft 126. The rotation of the ring gear 122 is transmitted to an axle 112 and wheels 116R and 116L via a chain belt 129 and a differential gear 114.

The control system 200 utilizes a diversity of sensors to attain the control of the whole hybrid vehicle. Such sensors include an accelerator sensor 165 that measures the step-on amount of an accelerator pedal by the driver, a gearshift position sensor 167 that detects the position of a gearshift lever, a brake sensor 163 that measures the step-on pressure of a brake pedal by the driver, an HV battery sensor 196 that detects the current charging state of the HV battery 194 (for example, a state of charge or charge level SOC and a voltage VH), a speed sensor 144 that measures the revolving speed of the motor MG2, and an ignition sensor 169 that detects a driver's turning motion of an ignition key. Here the brake sensor 163 and the ignition sensor 169 are connected to the brake ECU 220, while the accelerator sensor 165 and the gearshift position sensor 167 are connected to the ECU 210. The respective control units commonly use the pieces of information representing the observed and detected results of these sensors via communication lines.

The ring gear shaft 126 is mechanically linked with the axle 112 via the chain belt 129, so that the ratio of the revolving speed of the ring gear shaft 126 to that of the axle 112 is fixed. The speed sensor 144 disposed on the ring gear shaft 126 accordingly measures the revolving speed of the axle 112 as well as the revolving speed of the motor MG2.

B. Basic Operations in Hybrid Vehicle

The description first regards the operations of the planetary gear 120 to explain the basic operations in the hybrid vehicle. In the planetary gear 120, when the revolving speeds of any two rotating shafts among the three rotating shafts mentioned above are specified, the revolving speed of the residual rotating shaft is automatically determined. The revolving speeds of the respective rotating shafts hold the relationship defined as Equation (1) given below:

$$Nc = Ns \times \rho/(1+\rho) + Nr \times 1/(1+\rho p) \quad (1)$$

where Nc, Ns, and Nr respectively denote the revolving speed of the planetary carrier shaft 127, the revolving speed of the sun gear shaft 125, and the revolving speed of the ring gear shaft 126, and ρ represents a gear ratio of the sun gear 121 to the ring gear 122 as expressed by the following equation:

$$\rho = [\text{number of teeth of sun gear } 121]/[\text{number of teeth of ring gear } 122]$$

The torques of the three rotating shafts hold fixed relations defined as Equations (2) and (3) given below, irrespective of their revolving speeds:

$$Ts = Tc \times \rho/(1+\rho) \quad (2)$$

$$Tr = Tc \times 1/(1+\rho) = Ts/\rho \quad (3)$$

where Tc, Ts, and Tr respectively denote the torque of the planetary carrier shaft 127, the torque of the sun gear shaft 125, and the torque of the ring gear shaft 126.

The functions of the planetary gear 120 enable the hybrid vehicle of the embodiment to run in a variety of conditions. For example, in the state of a drive at a relatively low speed immediately after the start of the hybrid vehicle, the motor MG2 carries out the power operation to transmit the power to the axle 112 and drive the hybrid vehicle, while the engine 150 is at a stop or at an idle.

When the speed of the hybrid vehicle reaches a predetermined level, the control system 200 causes the motor MG1 to carry out the power operation and motors and starts the engine 150 with the torque output through the power operation of the motor MG1. At this moment, the reactive torque of the motor MG1 is output to the ring gear 122 via the planetary gear 120.

When the engine 150 is driven to rotate the planetary carrier shaft 127, the sun gear shaft 125 and the ring gear shaft 126 rotate under the conditions fulfilling Equations (1) through (3) given above. The power generated by the rotation of the ring gear shaft 126 is directly transmitted to the wheels 116R and 116L. The power generated by the rotation of the sun gear shaft 125 is, on the other hand, regenerated as electric power by the first motor MG1. The power operation of the second motor MG2 enables the power to be output to the wheels 116R and 116L via the ring gear shaft 126.

In the state of a stationary drive, the output of the engine 150 is set substantially equal to a required power of the axle 112 (that is, the revolving speed×torque of the axle 112). In this state, part of the output of the engine 150 is transmitted directly to the axle 112 via the ring gear shaft 126, while the residual power is regenerated as electric power by the first motor MG1. The second motor MG2 utilizes the regenerated electric power to produce a torque for rotating the ring gear shaft 126. The axle 112 is accordingly driven at a desired revolving speed and a desired torque.

When there is an insufficiency of the torque transmitted to the axle 112, the second motor MG2 supplements the insufficient torque. The electric power obtained by the regenerative operation of the first motor MG1 and the electric power accumulated in the HV battery 194 are used for such supplement. In this manner, the control system 200 controls the operations of the two motors MG1 and MG2 according to the required power to be output from the axle 112.

The hybrid vehicle of the embodiment may go back in the active state of the engine 150. While the engine 150 is driven, the planetary carrier shaft 127 rotates in the same direction as that in the case of the forward drive. In this state, when the first motor MG1 is controlled to rotate the sun gear shaft 125 at a higher revolving speed than the revolving speed of the planetary carrier shaft 127, the rotating direction of the ring gear shaft 126 is inverted to the direction for the rearward drive as clearly understood from Equation (1) given above. The control system 200 makes the second motor MG2 rotated in the direction for the rearward drive and regulates the output torque, thus enabling the hybrid vehicle to go back.

In the planetary gear 120, the planetary carrier 124 and the sun gear 121 may be rotated while the ring gear 122 is at a stop. The engine 150 is accordingly driven while the vehicle is at a stop. For example, when the HV battery 194 has a low charge level, the engine 150 is driven and causes the first motor MG1 to carry out the regenerative operation and charge the HV battery 194. The power operation of the first motor MG1 in the stationary state of the vehicle, on the other hand, motors and starts the engine 150 with the output torque.

C. Configuration of Control System in Embodiment

Figure 2:
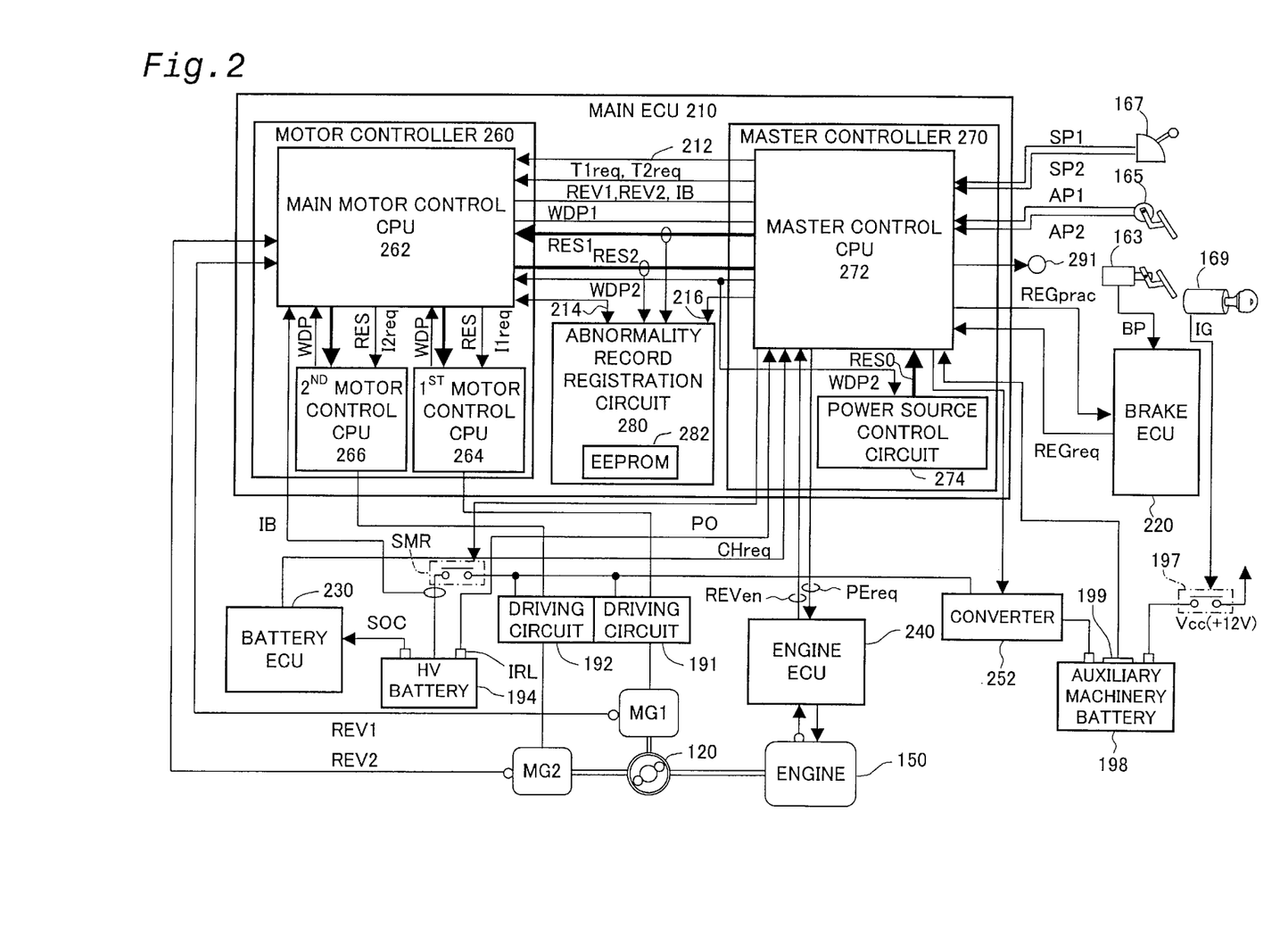
FIG. 2 is a block diagram illustrating the detailed configuration of a control system that controls the hybrid vehicle shown in FIG. 1.

FIG. 2 is a block diagram illustrating the detailed configuration of the control system 200 in this embodiment. The master controller 270 includes a master control CPU 272 and a power source control circuit 274. The motor controller 260 includes a main motor control CPU 262 and two motor control CPUs 264 and 266 that respectively control the two motors MG1 and MG2. Each of the CPUs is constructed as a one-chip microcomputer including a CPU, a ROM, a RAM, an input port, and an output port (not shown).

The master control CPU 272 functions to determine the control-relating quantities, for example, the distribution of the revolving speeds and the torques of the three prime movers 150, MG1, and MG2 and transmit a diversity of required values to the other CPUs and ECUs, so as to control the operations of the respective prime movers. In order to attain such control, accelerator position signals AP1 and AP2 representing the accelerator travel or position and gearshift position signals SP1 and SP2 representing the gearshift position are directly connected to an input port of the master control CPU 272. The master control CPU 272 also receives the ignition signal IG that represents an ignition-related operation and is transmitted from the ignition sensor 169 and a brake signal BP transmitted from the brake sensor 163 via the brake ECU 220. Both the accelerator sensor 165 and the gearshift position sensor 167 have a dual structure, that is, include two sensor elements. The master control CPU 272 accordingly receives the two accelerator position signals AP1 and AP2 and the two gearshift position signals SP1 and SP2. Indicators and lamps provided on an inner panel are connected to an output port of the master control CPU 272. In the illustration of FIG. 2, only a diagnosis lamp 291 is shown as a typical example. The master control CPU 272 controls its output port to directly light these indicators and lamps.

The power source control circuit 274 takes charge of controlling the power source system. In this embodiment, the power source control circuit 274 mainly has the function of a monitoring circuit that monitors abnormality in the master control CPU 272, and receives a signal WDP2 transmitted from the master control CPU 272.

The engine ECU 240 controls the engine 150 according to a required engine output PEreq given by the master control CPU 272. The engine ECU 240 feeds a revolving speed REVen of the engine 150 back to the master control CPU 272.

The main motor control CPU 262 transmits required electric currents I1req and I2req to the two motor control CPUs 264 and 266, based on required torques T1req and T2req of the two motors MG1 and MG2 given by the master control CPU 272. The motor control CPUs 264 and 266 respectively control the driving circuits 191 and 192 according to the required electric currents I1req and I2req, so as to drive the motors MG1 and MG2. The speed sensors of the motors MG1 and MG2 feed revolving speeds REV1 and REV2 of the motors MG1 and MG2 back to the main motor control CPU 262. The master control CPU 272 receives the revolving speeds REV1 and REV2 of the motors MG1 and MG2 as well as a value of electric current IB supplied from the HV battery 194 to the driving circuits 191 and 192, which are fed back from the main motor control CPU 262.

The two control CPUs 262 and 272 are connected to an abnormality record registration circuit 280 via bidirectional communication lines 214 and 216 to read and write data. There is another bidirectional communication line 212 interposed between the master control CPU 272 and the main motor control CPU 262 to transmit a variety of data including verification of the validity of the processing.

The battery ECU 230 monitors the state of charge or charge level SOC of the HV battery 194 and supplies a value representing the current voltage of the HV battery 194 as well as a required value of charging CHreq of the HV battery 194, when required, to the master control CPU 272. The master control CPU 272 determines the output of each prime mover by taking into account the required value of charging CHreq. In the case of a requirement for charging, the master control CPU 272 causes the engine 150 to output a greater power than the value required for the drive and distributes part of the output power to the charging operation by means of the first motor MG1.

The brake ECU 220 carries out control to balance a hydraulic brake (not shown) with the regenerative brake by the second motor MG2. This is because the second motor MG2 carries out the regenerative operation to charge the HV battery 194 in the course of braking the hybrid vehicle of the embodiment. In accordance with a concrete procedure, the brake ECU 220 transmits a required regenerative power REGreq to the master control CPU 272, based on a brake pressure BP measured by the brake sensor 163. The master control CPU 272 specifies the operations of the motors MG1 and MG2 in response to the required regenerative power REGreq and feeds an actual regenerative power REGprac back to the brake ECU 220. The brake ECU 220 regulates the amount of braking by the hydraulic brake to an adequate value, based on the observed brake pressure BP and the difference between the required regenerative power REGreq and the actual regenerative power REGprac.

As described above, the master control CPU 272 determines the outputs of the respective prime movers 150, MG1, and MG2 and transmits the required values to the ECU 240 and the CPUs 264 and 266, which take in charge of the actual controls. The ECU 240 and the CPUs 264 and 266 control the respective prime movers in response to the required values. The hybrid vehicle is accordingly driven with the adequate power output from the axle 112 according to the driving state. In the course of braking, the brake ECU 220 cooperates with the master control CPU 272 to regulate the operations of the respective prime movers and the hydraulic brake. This arrangement attains the desirable braking operation that does not make the driver uneasy or uncomfortable, while allowing regeneration of electric power.

The master controller 270 in the main ECU 210 or more specifically the master control CPU 272 functions to monitor operations of the auxiliary machinery battery 198 and the converter 252. When the driver turns the ignition key to require a start of the vehicle, the low voltage power source Vcc is supplied as shown in FIG. 2. The master control CPU 272 starts the series of processing in response to the supply of the low voltage power source Vcc. As illustrated in FIG. 2, the master control CPU 272 is connected with the converter 252 that converts the high voltage direct current of the HV battery 194 into low voltage direct current and with a voltage sensor 199 that is mounted on the auxiliary machinery battery 198 to measure the voltage of the auxiliary machinery battery 198 and output a measurement signal VCE. The ignition sensor 169 outputs the starting requirement signal IG in response to a turning motion of the ignition key. The starting requirement signal IG switches the relay 197 on to allow supply of the low voltage power source Vcc. The master control CPU 272 receives the supply of the low voltage power source Vcc, switches on and off the system main relay SMR according to the voltage VCE of the auxiliary machinery battery 198, and controls the operations of the converter 252 when required. This series of the processing will be discussed later in detail.

An input port of the abnormality record registration circuit 280 receives the reset signals RES1 and RES2 transmitted between the master control CPU 272 and the main motor control CPU 262. The abnormality record registration circuit 280 registers the input reset signals RES1 and RES2 into an internal EEPROM 282. Namely the abnormality record registration circuit 280 has the function of monitoring generation of the reset signal and registering the generation record in response to a reset of the master control CPU 272 or the main motor control CPU 262.

D. Assured Safety under Condition of Lowered Battery Voltage

The respective ECUs, controllers, and CPUs work in the above manner in the hybrid vehicle of the embodiment. Such control operations are, however, on the premise that the HV battery 194 and the auxiliary machinery battery 198 ensure the normal power supply. The structure of the embodiment controls the power supply from these batteries according to the procedure discussed below.

Figure 3:
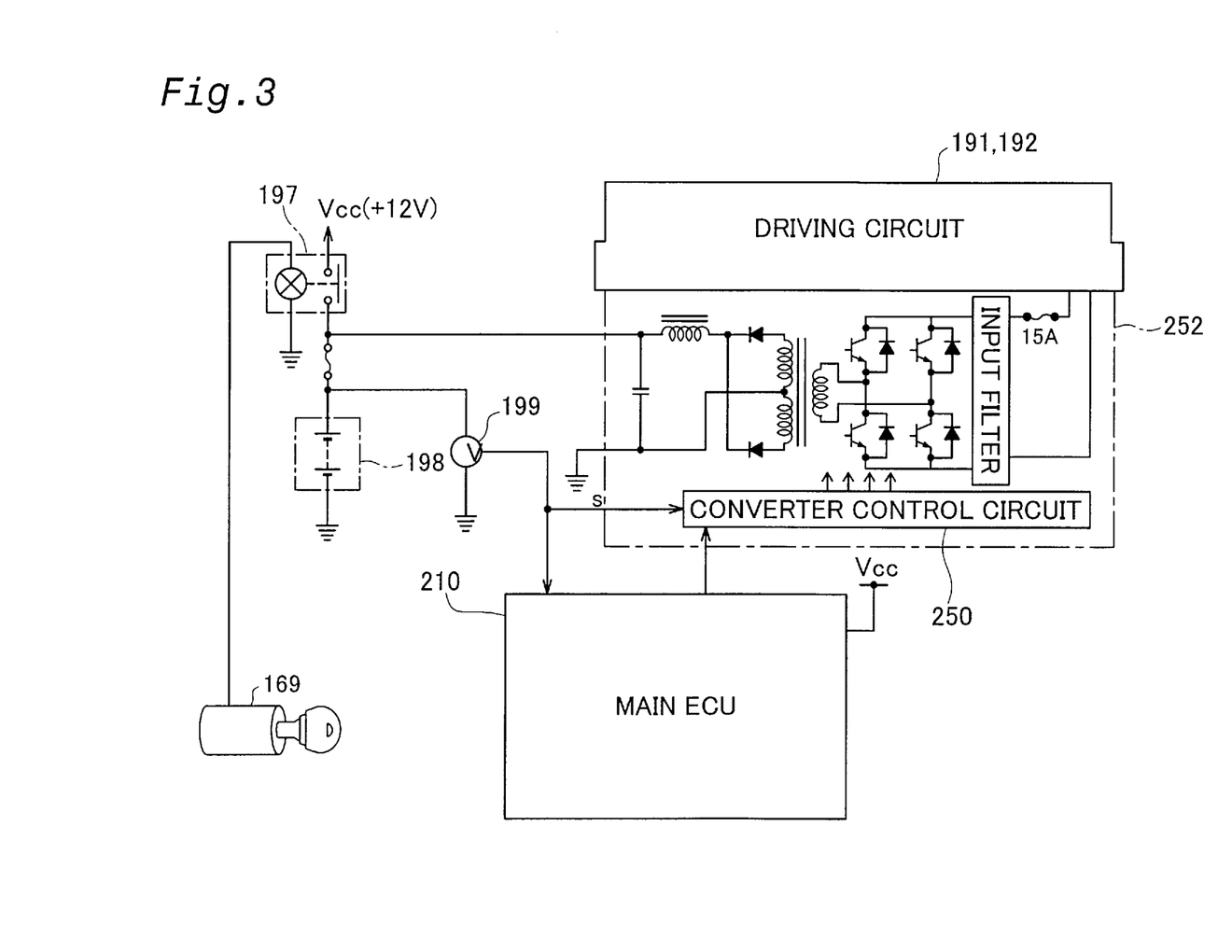
FIG. 3 illustrates the detailed configuration of a converter mounted on the hybrid vehicle shown in FIG. 1.
Figure 4:
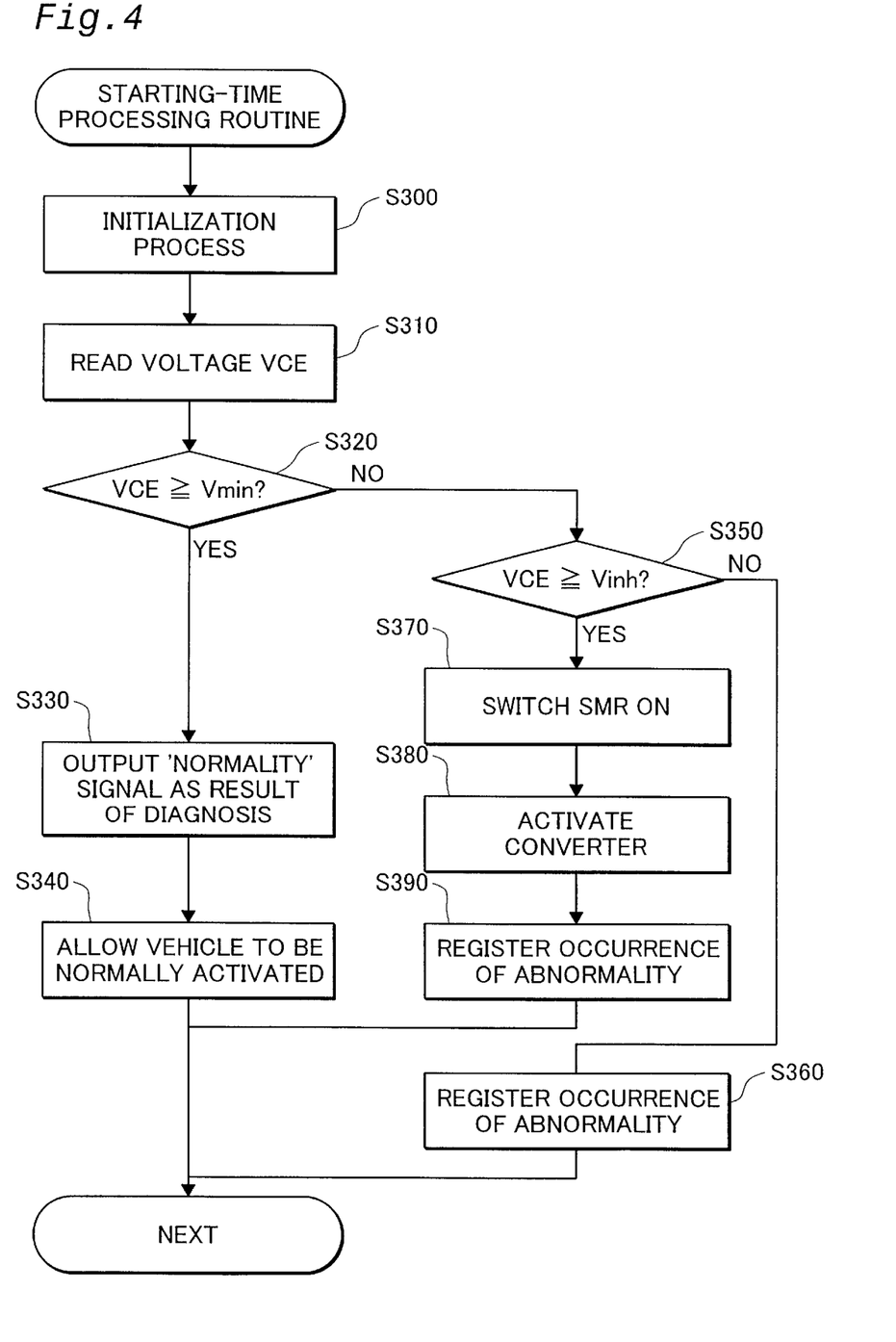
FIG. 4 is a flowchart showing a processing routine executed at the time of starting the hybrid vehicle.

FIG. 3 is a circuit diagram illustrating the internal structure of the converter 252 including the connections with the auxiliary machinery battery 198, the relay 197, and the main ECU 210. FIG. 4 is a flowchart showing a series of processing executed by the master control CPU 272 in the main ECU 210.

Referring to FIG. 3, the converter 252 first smoothes the high voltage of the HV battery 194 and the driving circuits 191 and 192 by means of an input filter, converts the smoothed high voltage into alternating current in its transistor bridge circuit, and converts the high voltage alternating current into a low voltage by means of a transformer TR. The converted low voltage alternating current is subjected to rectifying and smoothing processes to eventually charge the auxiliary machinery battery 198. A converter control circuit 250 monitors the voltage VCE of the auxiliary machinery battery 198 measured by the voltage sensor 199 and controls the transistor bridge circuit to make the terminal voltage of the auxiliary machinery battery 198 constant. The terminal voltage of the auxiliary machinery battery 198 accordingly has a fixed value, regardless of the revolving speed of the engine 150.

The converter control circuit 250 receives a control signal from the master control CPU 272 and causes the converter 252 to carry out the power conversion from the high voltage power source system to the low voltage power source system in response to the control signal at the high level. The master control CPU 272 receives the voltage signal VCE transmitted from the voltage sensor 199 mounted on the auxiliary machinery battery 198. The relay 197 has a contact disposed in the power line of the auxiliary machinery battery 198. The voltage of the auxiliary machinery battery 198 is applied via the contact as the power source voltage Vcc for the electronic equipment including the main ECU 210.

In response to the supply of the power source voltage Vcc via the relay 197 in ON position, the master control CPU 272 starts the processing routine shown in the flowchart of FIG. 4. When the program enters this routine, the master control CPU 272 first carries out a predetermined initialization process at step S300. On completion of the initialization process, the master control CPU 272 reads the voltage signal VCE of the voltage sensor 199 at step S310. The voltage signal VCE is subsequently compared with a preset minimum reference voltage Vmin at step S320. A specific value that establishes the low voltage power source Vcc and enables all the ECUs to be normally activated is set to the minimum reference voltage Vmin. In this embodiment, the minimum reference voltage Vmin is set equal to 10.5 V.

When it is determined at step S320 that the voltage VCE of the auxiliary machinery battery 198 is not lower than the minimum reference voltage Vmin, the master control CPU 272 determines that there is no abnormality in the power source system and outputs a 'normality' signal, which represents the 'normal' state, as the result of diagnosis at step S330. The master control CPU 272 may output this signal independently or may alternatively output this signal after verification of the validity of the processing in the other ECUs. After outputting the 'normality' signal as the result of diagnosis, the master control CPU 272 starts an ordinary vehicle starting control specified in advance at step S340.

When it is determined at step S320 that the voltage VCE of the auxiliary machinery battery 198 is lower than the minimum reference voltage Vmin, on the other hand, the voltage VCE of the auxiliary machinery battery 198 is further compared with an operation inhibiting reference voltage Vinh, which is lower than the minimum reference voltage Vmin, at step S350. A specific value corresponding to a threshold value that ensures the normal operation of the system main relay SMR working with the low voltage power source is set to the operation inhibiting reference voltage Vinh. In this embodiment, the operation inhibiting reference voltage Vinh is set equal to 8.5 V. The converter 252 works normally when the voltage of the auxiliary machinery battery 198 is not lower than the operation inhibiting reference voltage Vinh. This is because the operation guaranteed voltage of the converter 252 used in this embodiment is 8 V.

When it is determined at step S350 that the voltage VCE of the auxiliary machinery battery 198 is lower than the operation inhibiting reference voltage Vinh, the master control CPU 272 determines that the voltage of the auxiliary machinery battery 198 is too low to normally actuate the system main relay SMR, flashes the diagnosis lamp 291, and registers the occurrence of abnormality in the abnormality record registration circuit 280 at step S360. The program then goes to NEXT and exits from this processing routine. When the voltage of the auxiliary machinery battery 198 is significantly lower than the operation inhibiting reference voltage Vinh and even lower than the minimum voltage to allow the operation of each ECU (approximately 4 V in this embodiment), the master control CPU 272 may not function normally. In such cases, a power source monitoring circuit incorporated in each ECU keeps the ECU in the reset state. This arrangement prevents the master control CPU 272 from outputting any wrong signal to the converter control circuit 250.

When it is determined at step S350 that the voltage VCE of the auxiliary machinery battery 198 is not lower than the operation inhibiting reference voltage Vinh, on the other hand, the master control CPU 272 switches the system main relay SMR on at step S370. The system main relay SMR closes its contact and allows the electric power output from the HV battery 194 to be supplied to the high voltage power line. The converter 252 accordingly receives the supply of electric power to be activated. At this stage, the 'normality' signal output at step S330 as the result of diagnosis has not yet been output, so that the motor controller 260 does not actuate the motor MG1 or MG2. After the system main relay SMR is switched on, the master control CPU 272 outputs the control signal to the converter control circuit 250 of the converter 252 and activates the converter 252 at step S380. The converter 252 accordingly carries out DC-DC conversion with the HV battery 194 as the power source and charges the auxiliary machinery battery 198. The procedure of the embodiment switches the system main relay SMR on, regardless of the voltage of the HV battery 194. In accordance with another applicable procedure, the master control CPU 272 causes the battery ECU 230 to measure the voltage of the HV battery 194, prior to driving the system main relay SMR. In the case where the observed voltage of the HV battery 194 is insufficient, the procedure does not switch the system main relay SMR on, but registers the occurrence of abnormality in the abnormality record registration circuit 280.

In the above series of the processing, when the voltage VCE of the auxiliary machinery battery 198 is not lower than the operation inhibiting reference voltage Vinh but lower than the minimum reference voltage Vmin, the procedure turns the system main relay SMR on and uses the converter 252 to charge the auxiliary machinery battery 198. In this case, the voltage VCE of the auxiliary machinery battery 198 is still lower than the expected range of the normal working voltage. The procedure accordingly detects the occurrence of abnormality, lights the diagnosis lamp 291 on, and registers the occurrence of abnormality in the abnormality record registration circuit 280 at step S390. The record of the occurrence of abnormality may be read from the abnormality record registration circuit 280 in a maintenance mode. The program then goes to NEXT and exits from this processing routine.

When the auxiliary machinery battery 198 is charged by means of the converter 252 at step S380, the voltage VCE of the auxiliary machinery battery 198 increases to exceed the minimum reference voltage Vmin. The processing routine shown in the flowchart of FIG. 4 is repeatedly executed at preset intervals. With an increase in voltage VCE of the auxiliary machinery battery 198, the decision at step S320 eventually gives an affirmative answer. The 'normality' signal is accordingly output as the result of the diagnosis at step S330. All the ECUs start predetermined processes at once in response to the output of the 'normality' signal. This activates the vehicle and enables the driver to drive the vehicle.

The series of the processing discussed above is summarized according to the magnitude of the voltage VCE of the auxiliary machinery battery 198. There are three primary control procedures (1) through (3) discussed below. For the better understanding of the explanation, FIG. 5 shows the three primary control procedures related to the magnitude of the voltage VCE of the auxiliary machinery battery 198.

Figure 5:
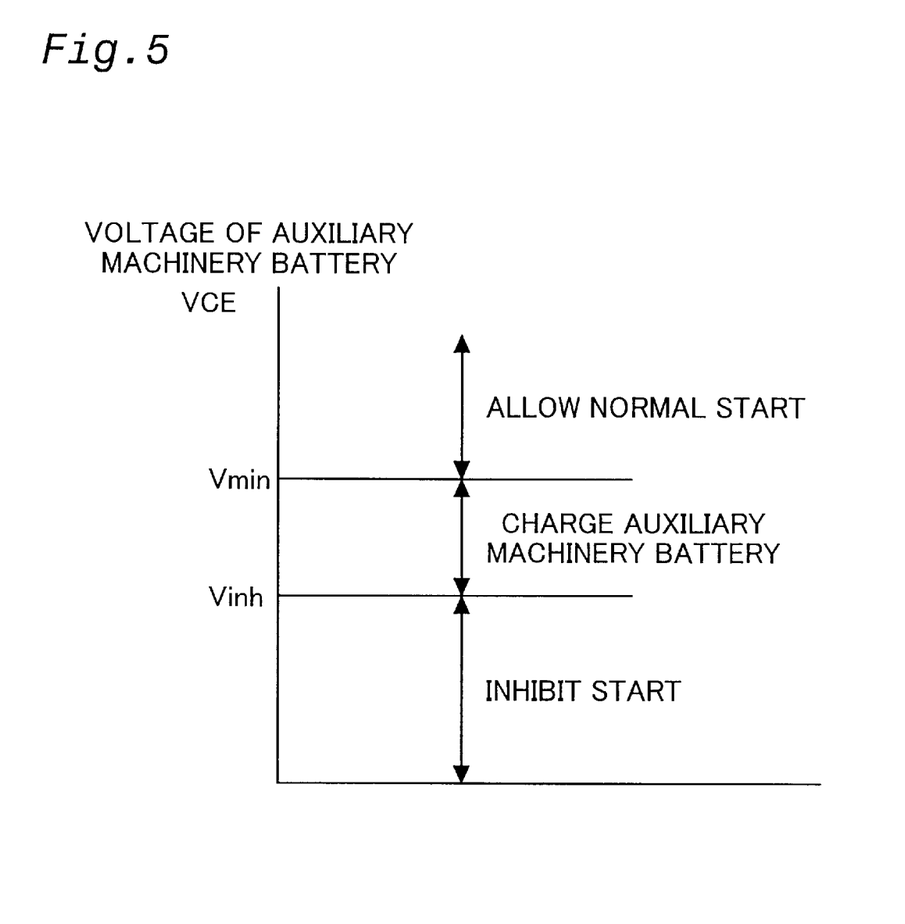
FIG. 5 shows control procedures according to the magnitude of a voltage signal of an auxiliary machinery battery used in the hybrid vehicle as a low voltage battery.

(1) When the output voltage VCE of the auxiliary machinery battery 198 is lower than the operation inhibiting reference voltage Vinh, which represents the threshold value ensuring the normal operation of the system main relay SMR that is one of the equipment establishing the high voltage power source system, no electronic apparatus works as shown in FIG. 5. Under such conditions, the master control CPU 272 detects that the voltage VCE of the auxiliary machinery battery 198 is lower than the operation inhibiting reference voltage Vinh and does not output the 'normality' signal as the result of the diagnosis. Meanwhile each of the ECUs is not activated but is kept in the reset state. The procedure accordingly keeps the system main relay SMR off (the contact is in open position) and prohibits the converter 252 from being activated.

(2) When the output voltage VCE of the auxiliary machinery battery 198 is not lower than the operation inhibiting reference voltage Vinh but is lower than the minimum reference voltage Vmin, which ensures the normal operations of the electronic devices including the main ECU 210, the master control CPU 272 switches the system main relay SMR on and activates the converter 252. The converter 252 in the active state causes the auxiliary machinery battery 198 to be gradually charged by means of the HV battery 194 as the high voltage power source. Under such conditions, however, the master control CPU 272 still does not output the 'normality' signal as the result of the diagnosis, so that the permission for operation is not given to the motor controller 260. This is because the voltage of the auxiliary machinery battery 198 has not yet reached the allowable level. In this case, the master control CPU 272 registers the information regarding the abnormality of the power source in the abnormality record registration circuit 280.

(3) In the above state (2), the converter 252 is activated to charge the auxiliary machinery battery 198 by means of the HV battery 194 as the high voltage power source. The voltage VCE of the auxiliary machinery battery 198 thus gradually increases and eventually reaches and exceeds the minimum reference voltage Vmin. When the voltage VCE of the auxiliary machinery battery 198 exceeds the minimum reference voltage Vmin, the master control CPU 272 detects the fact and outputs the 'normality' signal as the result of the diagnosis. The motor controller 260 including the main motor control CPU 262 starts operations in response to the output of the 'normality' signal, so as to start the whole system of the vehicle. In the case where the output voltage VCE of the auxiliary machinery battery 198 is not lower than the minimum reference voltage Vmin even in the initial stage of the starting procedures, the master control CPU 272 immediately outputs the 'normality' signal as the result of the diagnosis and starts the vehicle. In this case, no information regarding the abnormality of the power source is registered in the abnormality record registration circuit 280.

Even when the auxiliary machinery battery 198 continuously discharges to or below the minimum voltage level (10.5 [V]) that does not allow the auxiliary machinery battery 198 alone to establish the power source of the low voltage power source system, the hybrid vehicle of the embodiment constructed and controlled as discussed above does not immediately fall into the starting unable state. Even under such conditions, when it is allowed to convert the electric power of the HV battery 194 in the high voltage power source system into a low voltage by means of the converter 252 and supplement the voltage drop of the auxiliary machinery battery 198 (to or above 144 [V]), the converter 252 is immediately activated to supply the electrical energy to the low voltage power source system, thereby allowing the hybrid vehicle to start. The arrangement of the embodiment ensures a start of the hybrid vehicle, except when the terminal voltage of the auxiliary machinery battery 198 is lowered to or below the operation inhibiting voltage level (8.5 [V]) that represents the threshold value ensuring the normal operation of the system main relay SMR, which is one of the equipment for establishing the high voltage power source system. This arrangement significantly reduces the frequency of unsuccessful start due to the voltage drop of the auxiliary machinery battery 198.

In the arrangement of the embodiment, even when the auxiliary machinery battery 198 is charged by means of the converter 252 to recover its voltage to the allowable level for starting the vehicle, the master control CPU 272 still registers the occurrence of abnormality in the abnormality record registration circuit 280 and flashes the diagnosis lamp 291 according to the requirements. This arrangement informs the driver of the occurrence of abnormality, that is, the unexpected voltage drop of the auxiliary machinery battery 198 and enables the driver to take any required measures, for example, maintenance of the vehicle.

The technique of the present invention may be attained by another application, which is described below as a second embodiment of the present invention. The structure of the second embodiment uses the power source circuit to monitor the voltage of the auxiliary machinery battery 198 and compare the observed voltage VCE of the auxiliary machinery battery 198 with the minimum reference voltage Vmin and with the operation inhibiting reference voltage Vinh. For example, the battery ECU 230 continuously monitors the voltage of the auxiliary machinery battery 198 and carries out the comparison with regard to the observed voltage VCE of the auxiliary machinery battery 198 in response to a starting requirement. When VCE≧Vinh, the relay 197 is switched on to activate all the ECUs with the supply of the low voltage power source Vcc. At this moment, the master control CPU 272 receives a flag F transmitted from the battery ECU 230. The flag F is set equal to 1 when Vinh≦VCE≦Vmin, and otherwise equal to 0 by the battery ECU 230.

Figure 6:
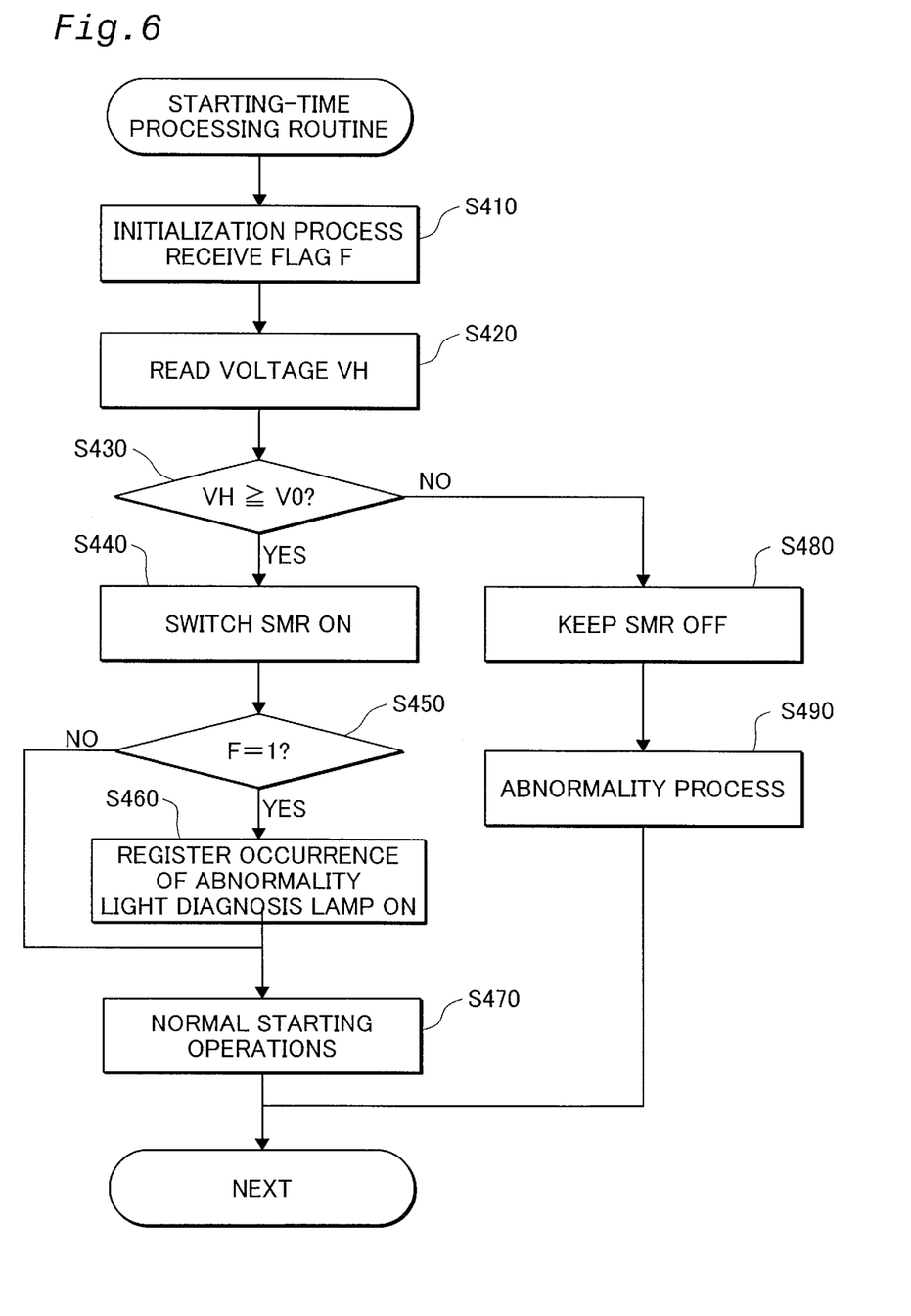
FIG. 6 is a flowchart showing another processing routine executed at the time of starting the hybrid vehicle in a second embodiment of the present invention.

In response to the processing by the battery ECU 230, the master control CPU 272 executes a starting-time processing routine shown in the flowchart of FIG. 6. When the relay 197 is switched on to allow the power supply, the master control CPU 272 caries out an initialization process and receives the flag F from the battery ECU 230, which is continuously active, through communications at step S410. The master control CPU 272 then reads a signal transmitted from the HV battery sensor 196 and measures a terminal voltage VH of the HV battery 194 at step S420. The observed terminal voltage VH is compared with a predetermined threshold value V0 at step S430. Here the predetermined threshold value V0 represents a voltage sufficient for charging the auxiliary machinery battery 198 by means of the converter 252. The chargeable or unchargeable decision depends upon the performance of the converter 252. In the structure of the embodiment, the output of the converter 252 is stabilized at 14 [V] when the terminal voltage of the HV battery 194 is not lower than 144 [V]. This value is accordingly set to the predetermined threshold value V0.

When the terminal voltage VH of the HV battery 194 is not lower than the predetermined threshold value V0 at step S430, the master control CPU 272 switches on the system main relay SMR at step S440 and determines whether or not the value of the flag F received through communications is equal to one at step S450. When the value of the flag F is equal to one, the master control CPU 272 determines that the voltage of the auxiliary machinery battery 198 has been lower than the minimum reference value Vmin, registers the information representing the fact in the abnormality record registration circuit 280, and lights the diagnosis lamp 291 on at step S460. The master control CPU 272 then causes the whole master controller 270 to carry out normal starting operations at step S470. When the terminal voltage VH of the HV battery 194 is lower than the predetermined threshold value V0, which allows the auxiliary machinery battery 198 to be charged, at step S430, on the other hand, the master control CPU 272 keeps the system main relay SMR off at step S480 and carries out a high voltage abnormality process at step S490. The high voltage abnormality process registers the voltage drop in the abnormality record registration circuit 280. The process may additionally determine whether or not the HV battery 194 is chargeable by driving the engine 150. If chargeable, the process causes the engine ECU 240 to actuate the engine 150 and uses the motors MG1 and MG2 as the generators to charge the HV battery 194.

As in the case of the first embodiment, the technique of the second embodiment enables the hybrid vehicle to start even when the voltage of the auxiliary machinery battery 198 is lower than the minimum reference voltage Vmin. The technique of the second embodiment additionally determines whether or not the auxiliary machinery battery 198 is chargeable by means of the converter 252 by taking into account the observed voltage of the HV battery 194. When the HV battery 194 has the insufficient state of charge, the converter 252 is not activated to charge the auxiliary machinery battery 198. The battery ECU 230 continuously monitors the voltage of the auxiliary machinery battery 198. In the case where the voltage of the auxiliary machinery battery 198 is unexpectedly lowered to or below the operation inhibiting level, for example, due to light-on during a stop of the vehicle, this arrangement enables the driver to be warned at the earlier stage by alarm beeping or alarm light flashing. An applicable arrangement may even automatically turn off the light after confirming that the vehicle is at a stop.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The scope and spirit of the present invention are indicated by the appended claims, rather than by the foregoing description.

What is claimed is:

1. A vehicle that utilizes electrical energy of a high voltage power source system including a high voltage battery, said vehicle comprising:
   a control unit that carries out controls related to driving of said vehicle;
   a low voltage power source circuit that supplies electrical energy of a low voltage power source system including a low voltage battery to said control unit;
   a battery voltage measurement unit that measures a voltage level of the low voltage battery, and determines if the measured voltage level is lower than a preset voltage that enables said control unit to operate properly and higher than a minimum voltage that enables the low voltage battery to recover;

a converter unit that converts the electrical energy of the high voltage power source system into a low voltage and charges the low voltage battery with the converted low voltage electrical energy; and a recovery unit that, when an observed voltage of the low voltage battery is lower than a preset minimum reference voltage at the time of a requirement to start said vehicle, activates said converter unit to recover the voltage of the low voltage battery to the preset minimum reference voltage, prior to a permission to operate said control unit.

2. A vehicle in accordance with claim 1, said vehicle further comprising a connection unit that is actuated by part of said control unit with a power supply from the low voltage power source system and connects the high voltage battery to the high voltage power source system including said converter unit.

3. A vehicle in accordance with claim 2, said vehicle further comprising an inhibition unit that inhibits the operation of said recovery unit when an observed voltage of the low voltage battery is lower than an operation inhibiting reference voltage, the operation inhibiting reference voltage corresponding to a lower limit voltage that guarantees the normal operation of said connection unit.

4. A vehicle in accordance with claim 3, said vehicle further comprising an information unit that informs a driver of the activation of said recovery unit.

5. A vehicle in accordance with claim 3, said vehicle further comprising a storage unit that registers the activation of said recovery unit in the form of a record and outputs the registered record in response to an external requirement.

6. A vehicle in accordance with claim 2, said vehicle further comprising an information unit that informs a driver of the activation of said recovery unit.

7. A vehicle in accordance with claim 2, said vehicle further comprising a storage unit that registers the activation of said recovery unit in the form of a record and outputs the registered record in response to an external requirement.

8. A vehicle in accordance with claim 1, said vehicle further comprising an information unit that informs a driver of the activation of said recovery unit.

9. A vehicle in accordance with claim 8 said vehicle further comprising a storage unit that registers the activation of said recovery unit in the form of a record and outputs the registered record in response to an external requirement.

10. A vehicle in accordance with claim 1, said vehicle further comprising a storage unit that registers the activation of said recovery unit in the form of a record and outputs the registered record in response to an external requirement.

11. A vehicle in accordance with claim 1, said vehicle further comprising a motor that outputs power required for driving said vehicle, wherein the high voltage battery is used as an energy source of driving said motor.

12. A vehicle in accordance with claim 11, said vehicle further comprising:

an engine that outputs power by means of combustion of a fuel;

a generator that generates electric power with at least the output power of said engine; and a charging circuit that charges the high voltage battery with the electric power generated by said generator.

13. A power source system controller mounted on an apparatus that utilizes electrical energy of a high voltage power source system including a high voltage battery, said power source system controller comprising:

a low voltage power source circuit that supplies electrical energy of a low voltage power source system including a low voltage battery to a control unit that takes charge of controlling said apparatus;

a battery voltage measurement unit that measures a voltage level of the low voltage battery;

a converter unit that converts the electrical energy of the high voltage power source system into a low voltage and charges the low voltage battery with the converted low voltage electrical energy; and a recovery unit that, when an observed voltage of the low voltage battery is lower than a present minimum reference voltage at the time of a requirement to start said apparatus, activates said converter unit to recover the voltage of the low voltage battery to the preset minimum reference voltage, prior to a permission to operate said control unit.

14. A power source system controller in accordance with claim 13, said power source system controller further comprising an information unit that informs a user of the activation of said recovery unit.

15. A power source system controller in accordance with claim 13, said power source system controller further comprising a storage unit that registers the activation of said recovery unit in the form of a record and outputs the registered record in response to an external requirement.

16. In an apparatus that utilizes electrical energy of a high voltage power source system including a high voltage battery, a method of controlling a power source system, said method comprising the steps of:

supplying electrical energy of a low voltage power source system including a low voltage battery to a control unit that takes charge of controlling said apparatus;

in response to a decrease in observed voltage of the low voltage battery, converting the electrical energy of the high voltage power source system into a low voltage and charging the low voltage battery with the converted low voltage electrical energy; and when the observed voltage of the low voltage battery is lower than a preset minimum reference voltage at the time of a requirement to start said apparatus, recovering the voltage of the low voltage battery to the preset minimum reference voltage, prior to a permission to operate said control unit.

17. A method of controlling a start of a vehicle, said vehicle comprising a converter that converts electrical energy of a high voltage battery into a low voltage and supplies the converted low voltage and utilizing electrical energy of a high voltage power source system including the high voltage battery, said method comprising the steps of:

in response to a requirement to start said vehicle, comparing an observed voltage of a low voltage battery with a preset minimum reference voltage required to established a low voltage power source system including the low voltage battery; and when the observed voltage of the low voltage battery is lower than the preset minimum reference voltage at the time of a requirement to start said vehicle, activating said converter to recover the voltage of the low voltage battery to the present minimum reference voltage, prior to starting said vehicle.

18. A method in accordance with claim 17, said method further comprising the steps of:

setting in advance an operation inhibiting reference voltage, which is lower than the minimum reference voltage and represents a threshold value ensuring a normal operation of an apparatus that establishes a power source of the high voltage power source system; and when the observed voltage of the low voltage battery is lower than the operation inhibiting reference voltage at the time of the requirement to start said vehicle, inhibiting output from the high voltage battery to the high voltage power source system including said converter.

* * * * *